US010814681B2

(12) United States Patent
Gonzales, Jr. et al.

(10) Patent No.: US 10,814,681 B2
(45) Date of Patent: Oct. 27, 2020

(54) MOUNTING STEM FOR INFLATION VALVE AND SENSOR

(71) Applicant: Bridgestone Americas Tire Operations, LLC, Nashville, TN (US)

(72) Inventors: Freddie Gonzales, Jr., Brunswick, OH (US); Anthony B. Duncan, Wadsworth, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 0 days.

(21) Appl. No.: 16/092,478

(22) PCT Filed: Feb. 21, 2017

(86) PCT No.: PCT/US2017/018618
§ 371 (c)(1),
(2) Date: Oct. 10, 2018

(87) PCT Pub. No.: WO2017/180236
PCT Pub. Date: Oct. 19, 2017

(65) Prior Publication Data
US 2019/0118590 A1    Apr. 25, 2019

Related U.S. Application Data

(60) Provisional application No. 62/320,830, filed on Apr. 11, 2016.

(51) Int. Cl.
*F16K 15/20* (2006.01)
*B60C 23/04* (2006.01)
(Continued)

(52) U.S. Cl.
CPC ........ *B60C 23/0494* (2013.01); *B60C 29/005* (2013.01); *B60C 29/06* (2013.01); *B60C 23/0408* (2013.01); *Y10T 137/3662* (2015.04)

(58) Field of Classification Search
CPC .......... B60C 23/0496; Y10T 137/3584; Y10T 137/3662; Y10T 137/3724
(Continued)

(56) References Cited

U.S. PATENT DOCUMENTS 3,235,726 A    2/1966  Haller
3,789,867 A    2/1974  Yabor
(Continued)

FOREIGN PATENT DOCUMENTS

CN    201559487 U    8/2010
CN    204249746 U    4/2015
(Continued)

OTHER PUBLICATIONS

Passenger tire inflation valve stem with a TPMS sensor mount and large bore inflation valve stem used in agricultural tires, undated admitted prior art.
(Continued)

*Primary Examiner* — Robert K Arundale

(57) ABSTRACT

A mounting stem may receive an inflation valve and a tire pressure monitoring system sensor. The mounting stem may include a hollow stem including a distal end and a proximal end. The mounting stem may further include an enlarged dome formed on the proximal end and defining a dome shoulder facing distally for engaging a wheel rim. The dome may include a dome height extending proximally from the dome shoulder. The mounting stem may also include a longitudinal bore extending along a longitudinal axis from the distal end partially into the dome. A plurality of lateral bores may communicate the longitudinal bore with an outer surface of the dome, and may include lateral bore diameters at least 25% of the dome height. The lateral bores may be
(Continued)

located closer to the proximal end than to the dome shoulder. The dome may also include a threaded TPMS mounting hole defined therein.

10 Claims, 5 Drawing Sheets

(51) Int. Cl.
  *B60C 29/06* (2006.01)
  *B60C 29/00* (2006.01)
(58) Field of Classification Search
  USPC .......................................... 152/427; 73/146.8
  See application file for complete search history.

(56) References Cited

U.S. PATENT DOCUMENTS

| | | | |
|---|---|---|---|
| 4,058,009 A | 11/1977 | Etter-Felix | |
| 5,452,608 A | 9/1995 | Green | |
| 5,774,048 A | 6/1998 | Achterholt | |
| 5,844,131 A * | 12/1998 | Gabelmann | B60C 23/04 |
| | | | 73/146.8 |
| 6,119,714 A | 9/2000 | Otzen | |
| 6,292,095 B1 | 9/2001 | Fuller et al. | |
| 6,662,642 B2 | 12/2003 | Breed et al. | |
| 6,722,191 B2 | 4/2004 | Koch et al. | |
| 6,945,104 B2 * | 9/2005 | Uleski | B60C 23/0408 |
| | | | 340/443 |
| 7,158,018 B2 | 1/2007 | Schick | |
| 8,186,402 B2 | 5/2012 | Eigenbrode | |
| 8,373,551 B2 | 2/2013 | Laird et al. | |
| 8,490,478 B2 | 7/2013 | Korus | |
| 2002/0121132 A1 | 9/2002 | Breed | |
| 2003/0066343 A1 | 4/2003 | Fischer et al. | |
| 2005/0087228 A1 | 4/2005 | Uleski | |
| 2008/0035259 A1 | 2/2008 | Mancosu et al. | |
| 2009/0022357 A1 | 1/2009 | Katz | |
| 2010/0024539 A1 * | 2/2010 | Hamm | B60C 23/0408 |
| | | | 73/146.5 |
| 2011/0272038 A1 * | 11/2011 | Falkenborg | B60C 23/0496 |
| | | | 137/224 |
| 2012/0204634 A1 * | 8/2012 | Yu | B60C 23/0494 |
| | | | 73/146.8 |
| 2012/0312389 A1 * | 12/2012 | Kempf | B60C 23/0408 |
| | | | 137/227 |
| 2013/0030658 A1 | 1/2013 | Linster | |
| 2013/0333459 A1 * | 12/2013 | Yu | B60C 23/0494 |
| | | | 73/146.8 |
| 2014/0318231 A1 * | 10/2014 | Lo | B60C 23/0496 |
| | | | 73/146.8 |

FOREIGN PATENT DOCUMENTS

| | | |
|---|---|---|
| CN | 104626892 A | 5/2015 |
| DE | 10019082 B4 | 3/2006 |
| EP | 0377561 B1 | 8/1991 |
| TW | M405977 U | 6/2011 |
| WO | 2001017802 A1 | 3/2001 |
| WO | 2002062595 A1 | 8/2002 |
| WO | 2012022579 A1 | 2/2012 |

OTHER PUBLICATIONS

Willi Schork, Communication, Supplemental European Search Report and Written Opinion, dated Oct. 2, 2019, pp. 1-6, European Patent Office, Munich, Germany.
Machine translation of CN204249746U published on Apr. 8, 2015 owned by Shanghai Weibiao Auto Parts Mfg Co Ltd.
Machine translation of CN104626892A published on May 20, 2015 owned by Shenzhen Longhorn Automotive Electronic Equipment.
English Machine Translation of CN204249746U.
English Machine Translation of TWM405977U.
English Machine Translation of CN201559487U.

* cited by examiner

MOUNTING STEM FOR INFLATION VALVE AND SENSOR

BACKGROUND

The present disclosure relates generally to a mounting stem for an inflation valve and sensor. More particularly, the present disclosure relates to a mounting stem for an inflation valve and a Tire Pressure Monitoring System sensor.

Many street vehicles include Tire Pressure Monitoring System (TPMS) sensors. In 2007, a law was passed that required all newly manufactured street vehicles to include TPMS sensors. The type of TPMS sensor used works well for street vehicles because of the low volume of air needed in the relatively small pneumatic tires.

BRIEF SUMMARY

The present disclosure relates to a mounting stem for an inflation valve and a tire pressure monitoring system sensor. The mounting stem may include a hollow stem. The hollow stem may include a distal end and a proximal end. The stem may also include an enlarged dome formed on the proximal end. Furthermore, the stem may define a dome shoulder facing distally for engaging a wheel rim. The dome may have a dome height extending proximally from the dome shoulder. The stem may also include a longitudinal bore. The longitudinal bore may extend along a longitudinal axis from the distal end partially into the enlarged dome. The stem may further include a plurality of lateral bores. The lateral bores may communicate the longitudinal bore with an outer surface of the enlarged dome. The lateral bores may include lateral bore diameters at least 25% of the dome height. The enlarged dome may include a threaded TPMS mounting hole defined therein.

In a further embodiment, the lateral bores may be located such that each lateral bore axis is closer to the proximal end than to the dome shoulder.

In yet another embodiment, the plurality of lateral bores may include three lateral bores.

In a still further embodiment, a corresponding two of the lateral bores may be formed as a through hole in the enlarged dome.

In some embodiments, each of the lateral bore diameters may be at least 50% of a longitudinal bore diameter of the longitudinal bore.

In another exemplary embodiment, the present disclosure relates to a mounting stem for an inflation valve and a tire pressure monitoring system sensor. The mounting stem may include a hollow stem. The hollow stem may include a distal end and a proximal end. The stem may further include an enlarged dome formed on the proximal end. The enlarged dome may define a dome shoulder facing distally for engaging a wheel rim. The dome may include a dome height extending proximally from the dome shoulder. The stem may include a longitudinal bore. The longitudinal bore may extend along a longitudinal axis from the distal end partially into the enlarged dome. The stem may further include a plurality of lateral bores. The lateral bores may communicate the longitudinal bore with an outer surface of the enlarged dome. The lateral bores may be located closer to the proximal end than to the dome shoulder. The enlarged dome may include a threaded TPMS mounting hole defined therein.

Some embodiments may include the plurality of lateral bores including three lateral bores.

One embodiment may include a corresponding two of the lateral bores being formed as a through hole in the enlarged dome.

Another embodiment may include each of the lateral bore diameters being at least 50% of a longitudinal bore diameter of the longitudinal bore.

DETAILED DESCRIPTION

Figure 1:
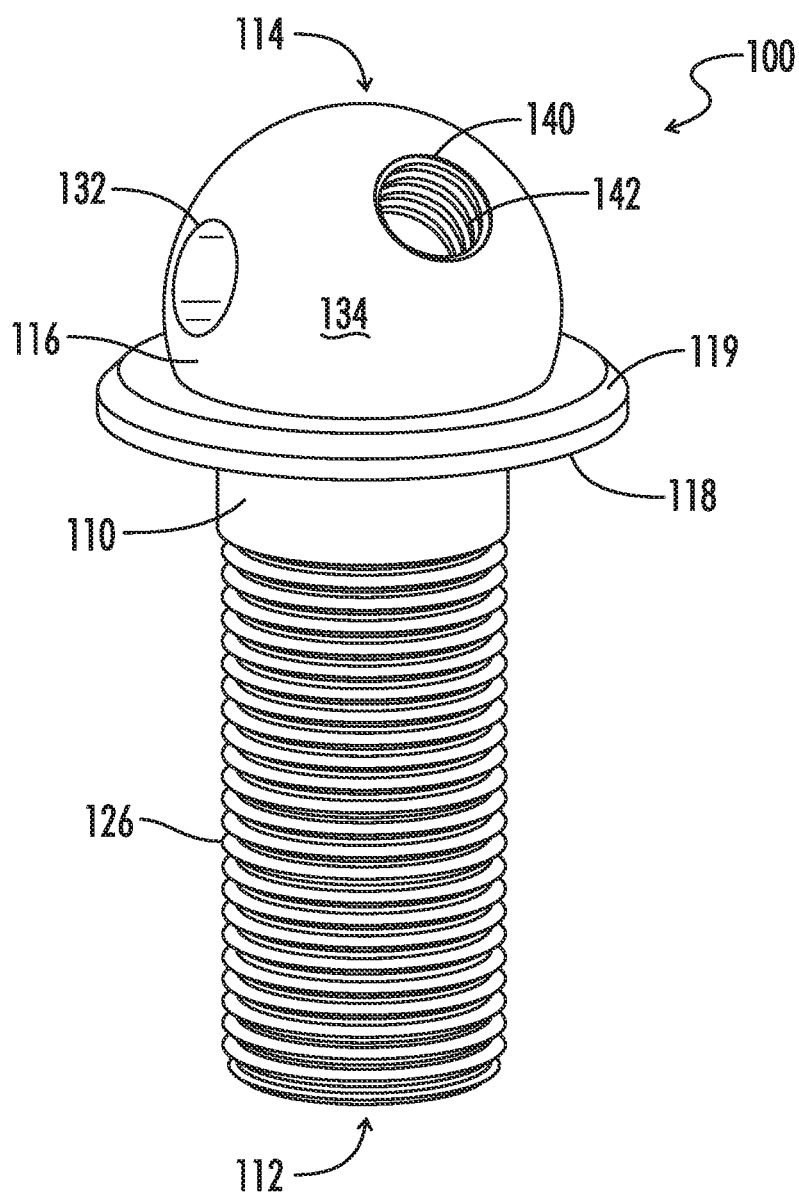
FIG. 1 is a perspective view of an embodiment of a mounting stem.
Figure 2:
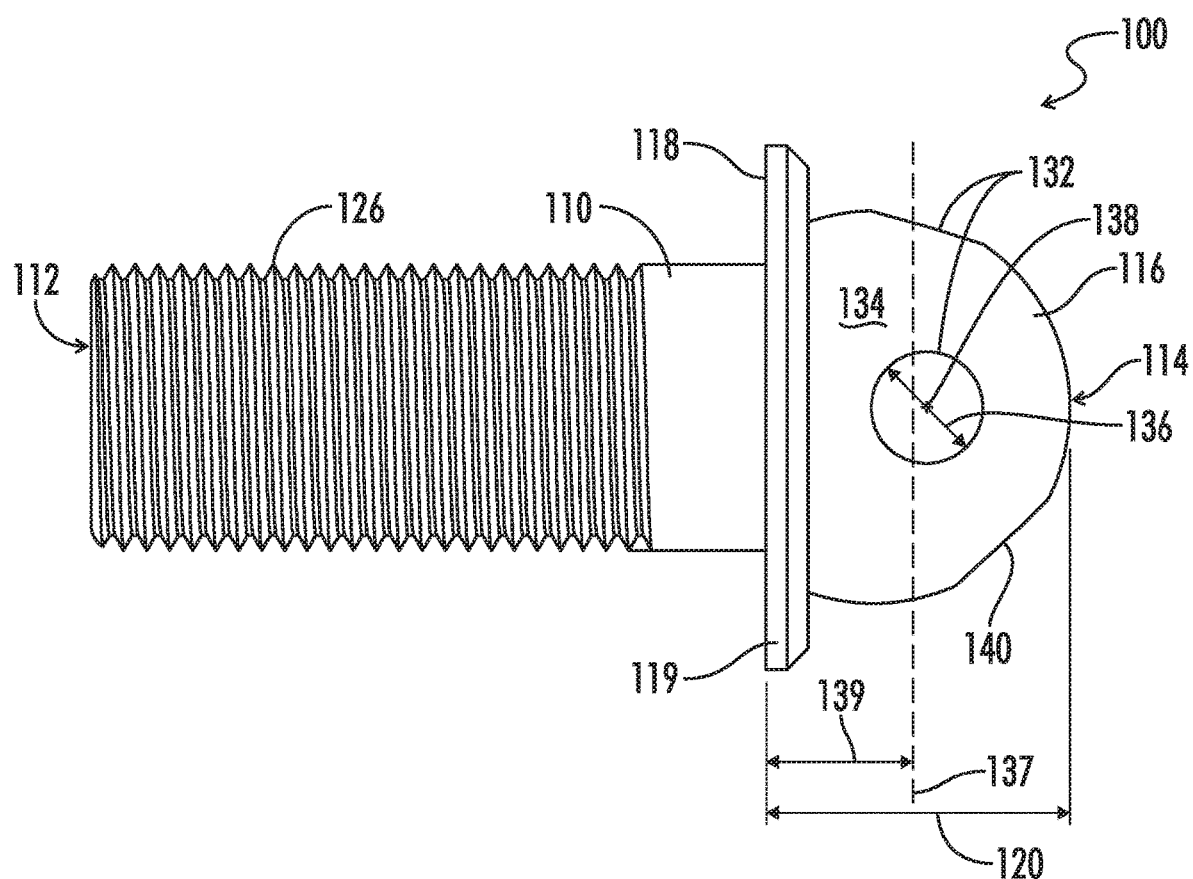
FIG. 2 is a right side elevation view of the mounting stem of FIG. 1, the left side elevation view being a mirror image of FIG. 2.

The present invention will now be described with reference to the accompanying drawings. Many embodiments are contemplated. The disclosure should not, however, be construed to be limited to the embodiments set forth herein.

Referring now to FIGS. 1-5, an embodiment of a mounting stem 100 for an inflation valve 102 and a TPMS sensor 104 (in FIG. 5) is shown. Any appropriate inflation valve 102 may be used. Likewise, any sensor to be located inside the pneumatic tire 106 and wheel 108 assembly may be mounted to the mounting stem 100. The sensor 104 is not limited to a TPMS sensor.

Figure 3:
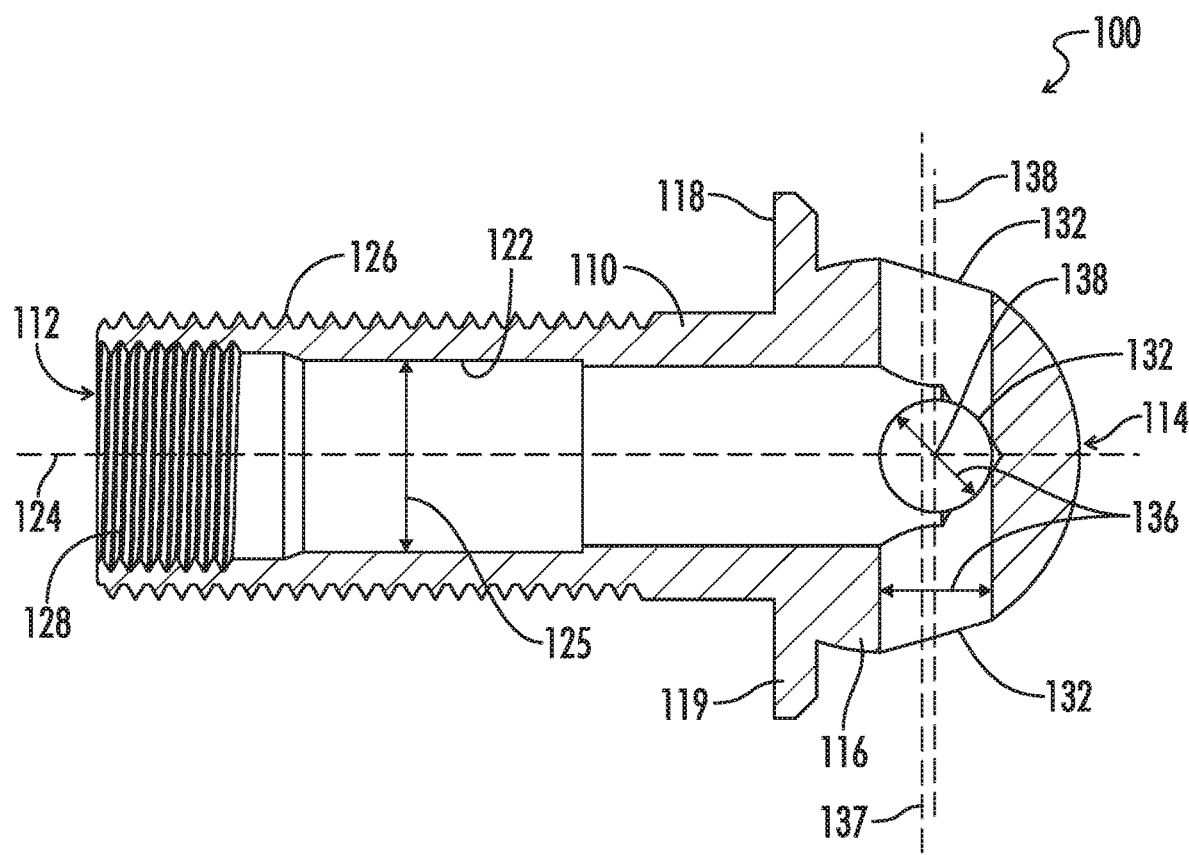
FIG. 3 is a top plan cross-sectional view of the mounting stem of FIG. 1.
Figure 5:
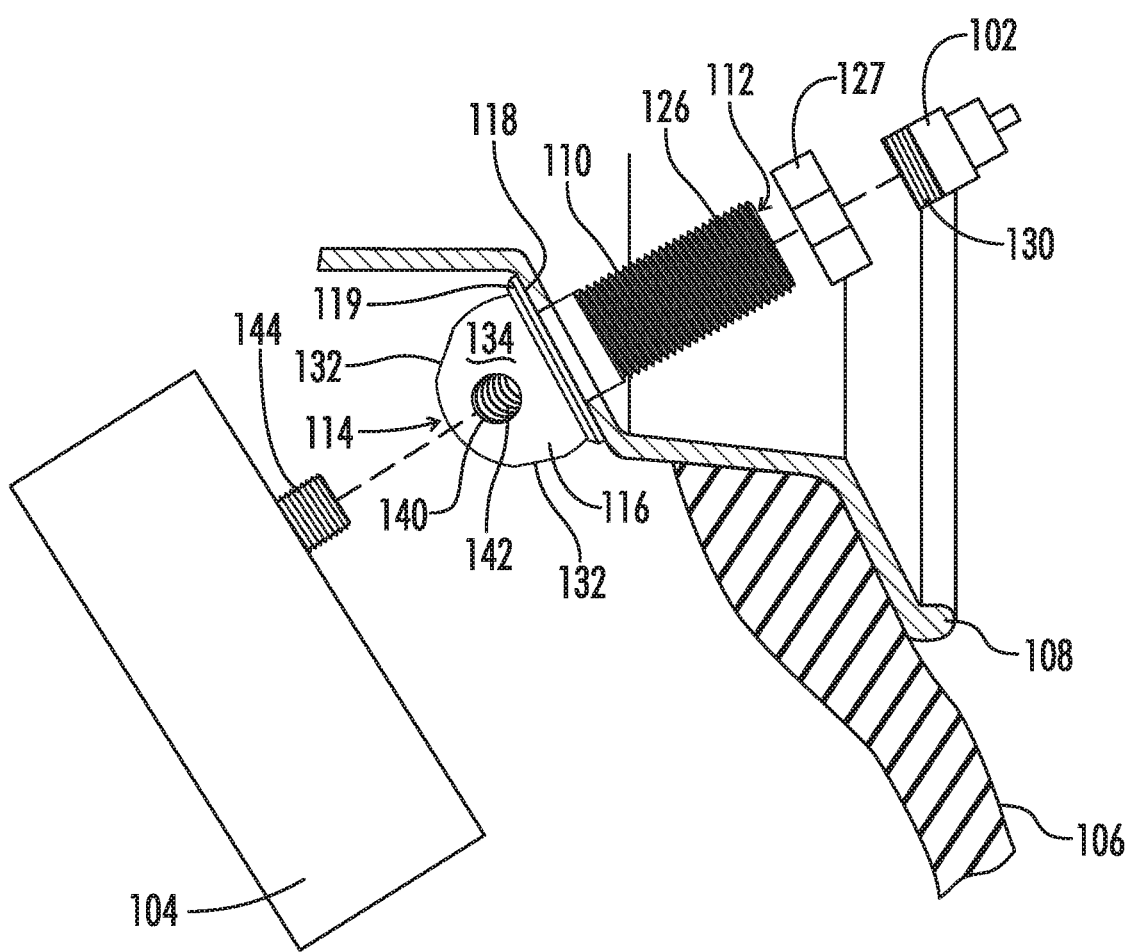
FIG. 5 is a side view of the mounting stem of FIG. 1 mounted on a wheel rim and tire assembly, and with a valve stem and TPMS sensor exploded therefrom.

The mounting stem 100 may include a hollow stem 110 (shown in FIG. 3). The mounting stem 100 may include a distal end 112 and a proximal end 114. The mounting stem 100 may further include an enlarged dome 116 formed on the proximal end 114. The dome 116 may define a dome shoulder 118 facing distally for engaging a rim of a wheel 108 (as shown in FIG. 5). The dome shoulder 118 may be defined on a dome flange 119 of the dome 116. The dome 116 and dome flange 119 may include any shape including non-limiting examples of cross-sections such as circular, semi-circular, ellipsoidal, trapezoidal, triangular, rectangular, square, and the like. The dome 116 may include a dome height 120 extending proximally from the dome shoulder 118. The dome height 120 may be any appropriate height. In some embodiments of the mounting stem 100, the dome shoulder 118 may be a continuous portion of the dome 116 with no dome flange 119.

As shown in FIG. 3, the stem 110 may include a longitudinal bore 122 extending along a longitudinal axis 124. The longitudinal bore 122 may extend from the distal end 112 partially into the enlarged dome 116. The longitudinal bore 122 may be sufficiently large to allow for greater quantities of air to flow therethrough as compared to mounting stems used with street vehicle wheels. In some embodiments, the longitudinal bore 122 includes a longitudinal bore diameter 125 of at least 0.2 inches. In other embodiments, the longitudinal bore 122 includes a longitudinal bore diameter 125 of at least 0.3 inches. The longitudinal bore 122 may also be of a continuous diameter throughout its length, or may vary throughout its length including, but not limited to, reducing or increasing in a continuous or stepped profile from the distal end 112 toward the proximal end 114.

The stem 110 may also include an outer helical thread 126 disposed on the outer surface of the stem along a portion of the stem from the distal end 112 toward the proximal end 114. The outer helical thread 126 may extend along all or only a portion of the stem 110 from the distal end 112 to the dome shoulder 118. As shown in FIG. 5, the outer helical thread 126 may be configured to accept a retaining nut 127 to maintain the mounting stem 100 in place on the wheel 108. Any other appropriate fasteners to maintain the mounting stem 100 in place on the wheel 108 are also contemplated. In some embodiments, the stem 110 may also include an inner helical thread 128 configured to accept a corresponding inflation valve helical thread 130. Some embodiments may include the stem 110 including an outer helical thread with the inflation valve 102 including an inner helical thread. Other embodiments may include any sort of fastening configuration such that the stem 110 accepts and retains the inflation valve 102 (or vice-versa) including, but not limited to, locking grooves and pegs, press-fit tolerances, resilient portions of either the stem or the inflation valve, retaining washers or nuts, lateral retaining bolts, glues, epoxies, and the like, and any combination thereof.

Turning now to FIG. 3, the stem 110 may also include a plurality of lateral bores 132 communicating the longitudinal bore 122 with an outer surface 134 of the enlarged dome 116. The lateral bores 132 may include lateral bore diameters 136 that are at least 25% of the dome height 120. In one embodiment, the lateral bores 132 may be closer to the proximal end 114 than to the dome shoulder 118. The plurality of lateral bores 132 may include 2, 3, 4, 5, or more lateral bores. The lateral bores 132 may be defined in the enlarged dome 116 such that the lateral bore axes 138 are in the same plane normal to the longitudinal axis 124. Other embodiments may include lateral bore axes 138 in different planes normal to the longitudinal axis 124. Still other embodiments may include lateral bore axes relative to the longitudinal axis 124 at any angles other than 90 degrees. In some embodiments, a corresponding two of the lateral bores 132 are formed as a through hole in the enlarged dome 116. In at least one embodiment, the lateral bores include lateral bore diameters 136 that are each at least 50% of the longitudinal bore diameter 125 of the longitudinal bore 122.

A mid-height of the dome 116 may be defined by a plane 137 located at a height 139 which is one-half of the dome height 120. The lateral bores 132 may overlap this plane 137.

Figure 4:
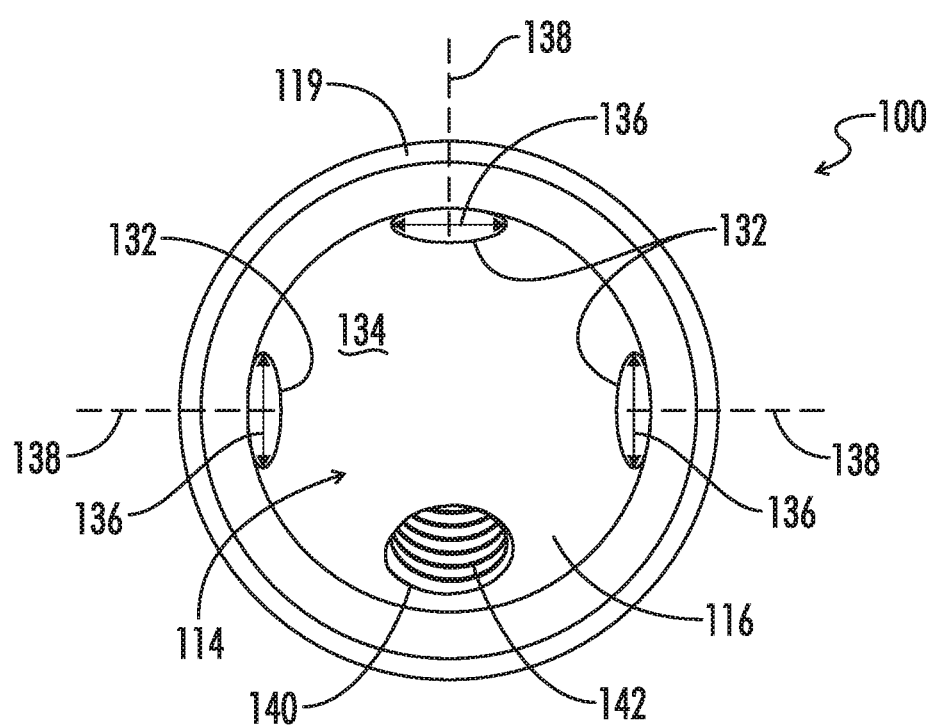
FIG. 4 is a front elevation view of the mounting stem of FIG. 1.

As shown in FIGS. 4 and 5, the mounting stem 100 may also include the enlarged dome 116 including a TPMS mounting hole 140 defined therein. The TPMS mounting hole 140 may include a mounting hole inner thread 142 configured to accept a corresponding TPMS sensor outer thread 144 of the TPMS sensor 104. Some embodiments may include the mounting stem 100 including a TPMS mounting projection with an outer helical thread and the TPMS sensor 104 including an inner helical thread. Other embodiments may include any sort of fastening configuration such that the mounting stem 100 accepts and retains the TPMS sensor 104 including, but not limited to, locking grooves and pegs, press-fit tolerances, resilient portions of either the stem or the inflation valve, retaining washers or nuts, lateral retaining bolts, glues, epoxies, and the like, and any combination thereof. The TPMS sensor outer thread 144, or any corresponding TPMS sensor mount, may be formed as a single part with the TPMS sensor 104 or may be a separately connectable fastener to maintain the TPMS sensor engaged with the mounting stem 100.

In one example, the mounting stem 100 may include the hollow stem 110 including the longitudinal bore 122 with a longitudinal bore diameter 125 in a decreasing stepped profile from the distal end 112 toward the proximal end 114. The longitudinal bore diameter 125 may start at 0.35 inches, step down to 0.32 inches, and step down again to 0.30 inches. At least one of the narrowing steps may include an inward angle of 20 degrees toward the longitudinal axis 124 from a line parallel to the longitudinal axis. One of these narrowing steps may be between the widest and mid-sized steps and may be 0.03 inches long. The widest step portion may include the inner helical thread 128 and may be 0.31 inches long. The helical thread may have a minor diameter ranging from 0.341 to 0.349 inches and a thread of 0.375 (-32) inches. The mid-sized step may be 0.47 inches long. The hollow stem 110 may include an outer diameter of 0.48 inches. The hollow stem 110 may include a length from the distal end 112 to the dome shoulder 118 of 1.13 inches. This length may include a non-threaded portion extending from the dome shoulder 118 toward the distal end 112 for a length of 0.21 inches. The threaded portion of the hollow stem 110 includes the outer helical thread 126. The outer helical thread 126 may include a major diameter of 0.474 inches to 0.482 inches and a thread of 0.482 (-26) inches. The dome flange 119 may have a thickness of 0.07 inches and a maximum diameter of 0.88 inches. The dome flange 119 may further include a portion with a flat edge and a portion with a tapering edge. The flat edge may be half of the thickness of the dome flange 119, and the tapering edge portion may be the other half of the thickness of the dome flange. Furthermore, the tapering edge portion may taper inwardly toward the longitudinal axis 124 from the flat edge portion toward the proximal end 114 of the mounting stem 100 at an angle of 45 degrees from a line parallel to the longitudinal axis. The enlarged dome 116 may have a radius of 0.33 inches. The lateral bore axis 138 of each lateral bore 132 may be 0.27 inches from the dome shoulder 118 toward the proximal end 114 of the mounting stem 100. The closest edge of each lateral bore 132 may be 0.18 inches from the dome shoulder 118 toward the proximal end 114 of the mounting stem 100. Furthermore, each lateral bore 132 may have a lateral bore diameter 136 of 0.1875 inches. The lateral bore axes 138 may be perpendicular to the longitudinal bore axis 124. The TPMS mounting hole 140 may be a #10 (-32) threaded hole and may extend away from the longitudinal axis 124 toward the direction of the proximal end 114 of the mounting stem 100 at an angle of 45 degrees.

Though the particular measurements listed above are not meant to be limiting on the scope of the present disclosure in any way, the measurements may be recognized to be a part of a particularly suitable embodiment of the present disclosure to accomplish at least one of the objectives apparent to one of skill in the art from reading the current disclosure. Such a valve stem 100 provides room for the larger longitudinal bore 122 and lateral bores 132 by placing them relatively high in the dome height 120, while still providing room for the TPMS mounting hole 140.

All the portions of the mounting stem 100 may be integrally formed or separately formed and properly attached by any means. The mounting stem 100 may be made of any appropriate material including, but not limited to, any suitable metal, polymer, composite, or any combination thereof.

The inventors have recognized a benefit to using a TPMS sensor 104 in large pneumatic tire 106 and wheel 108 assemblies, such as the tires used in agricultural and construction vehicles. These large pneumatic tires 106 each require a large volume of air to be properly filled. Filling a large pneumatic tire 106 can take a considerable amount of time. Reducing the time to fill a large pneumatic tire 106 may be desirable. As such, the inventors have discovered a configuration of a mounting stem 100 for an inflation valve 102 and sensor 104 suitable for large pneumatic tires 106 as discussed herein.

Thus, although there have been described particular embodiments of the present invention of a new and useful mounting stem for an inflation valve and sensor, it is not intended that such references be construed as limitations upon the scope of this invention except as set forth in the following claims.

What is claimed is:

1. A mounting stem for an inflation valve and a tire pressure monitoring system sensor, the mounting stem comprising: a hollow stem having a distal end and a proximal end, the stem including an enlarged dome formed on the proximal end and defining a dome shoulder facing distally for engaging a wheel rim, the dome having a dome height extending proximally from the dome shoulder; the stem including a longitudinal bore extending along a longitudinal axis from the distal end partially into the enlarged dome, and the stem further including a plurality of open lateral bores configured to fluidly communicate the longitudinal bore with an outer surface of the enlarged dome when the mounting stem is mounted on the wheel rim, the lateral bores having lateral bore diameters at least 25% of the dome height, and each lateral bore having a lateral bore axis oriented perpendicular to the longitudinal axis and located closer to the proximal end than to the dome shoulder; and the enlarged dome including a threaded TPMS mounting hole defined therein.

2. The mounting stem of claim 1, wherein the plurality of lateral bores includes three lateral bores.

3. The mounting stem of claim 1, wherein each of the lateral bore diameters are at least 50% of a longitudinal bore diameter of the longitudinal bore.

4. The mounting stem of claim 1, further comprising an outer helical thread defined on the stem and extending along at least a portion of the stem, the outer helical thread configured to threadingly accept a retaining nut.

5. The mounting stem of claim 4, further comprising:
the dome shoulder engaging the wheel rim; and
the retaining nut threaded onto the outer helical thread of the stem, thereby retaining the mounting stem on the wheel rim.

6. The mounting stem of claim 1, further comprising an inner helical thread defined on the stem and extending along at least a portion of the longitudinal bore, the inner helical thread configured to threadingly accept the inflation valve.

7. The mounting stem of claim 6, further comprising the inflation valve threadingly engaged with the inner helical thread such that a portion of the inflation valve is retained in the longitudinal bore.

8. The mounting stem of claim 1, further comprising the tire pressure monitoring system sensor threadingly retained in the threaded TPMS mounting hole.

9. The mounting stem of claim 1, further comprising:
the dome shoulder engaging the wheel rim;
a retaining nut fastened to the stem, thereby retaining the mounting stem on the wheel rim;
the tire pressure monitoring system sensor fastened to the enlarged dome in the threaded TPMS mounting hole; and
the inflation valve fastened to the stem in the longitudinal bore.

10. A mounting stem for an inflation valve and a tire pressure monitoring system sensor, the mounting stem comprising: a hollow stem having a distal end and a proximal end, the stem including an enlarged dome formed on the proximal end and defining a dome shoulder facing distally for engaging a wheel rim, the dome having a dome height extending proximally from the dome shoulder; the stem including a longitudinal bore extending along a longitudinal axis from the distal end partially into the enlarged dome, and the stem further including a plurality of open lateral bores configured to fluidly communicate the longitudinal bore with an outer surface of the enlarged dome when the mounting stem is mounted on the wheel rim, the lateral bores having lateral bore diameters at least 25% of the dome height, and each lateral bore having a lateral bore axis located closer to the proximal end than to the dome shoulder; the enlarged dome including a threaded TPMS mounting hole defined therein; wherein the plurality of open lateral bores includes three open lateral bores; and wherein a corresponding two of the open lateral bores are formed as a through hole in the enlarged dome.

* * * * *